| United States Patent [19] | [11] Patent Number: 4,884,933 |
| Preusker et al. | [45] Date of Patent: Dec. 5, 1989 |

[54] ADAPTOR FOR SCREWHEADS AND THE LIKE

[75] Inventors: Rosel Preusker; Werner Preusker, both of Atzelgift, Fed. Rep. of Germany

[73] Assignee: Confon AG, Rheineck, Switzerland

[21] Appl. No.: 99,073

[22] Filed: Sep. 21, 1987

Related U.S. Application Data

[62] Division of Ser. No. 905,859, Sep. 10, 1986.

[30] Foreign Application Priority Data

| Sep. 13, 1985 | [DE] | Fed. Rep. of Germany ... 8526164[U] |
| Oct. 19, 1985 | [DE] | Fed. Rep. of Germany ... 8529687[U] |
| Oct. 29, 1985 | [DE] | Fed. Rep. of Germany ... 8530606[U] |
| Aug. 29, 1986 | [DE] | Fed. Rep. of Germany ... 8623171[U] |

[51] Int. Cl.$^4$ ............................................. F16B 37/04
[52] U.S. Cl. ..................... 411/177; 411/432; 411/374; 411/430; 403/287; 152/213 A
[58] Field of Search ............... 152/216, 214, 213 R, 152/213 A, 218, 225 R, 225 C, 226–230; 411/55, 372, 373, 374, 176, 429, 430, 431, 177, 183, 432, 433; 403/299, 287, 3; 301/36 R, 38 R, 40 R, 40 S, 41 R; 81/112–114

[56] References Cited

U.S. PATENT DOCUMENTS

| 2,443,466 | 6/1948 | Lord | 411/55 X |
| 2,568,788 | 9/1951 | Bossen | 81/114 |
| 2,796,907 | 6/1957 | Dumas | 411/55 |
| 3,114,528 | 12/1963 | Forest | 411/55 X |
| 4,386,643 | 6/1983 | Belknap, III et al. | 152/225 C X |
| 4,576,214 | 3/1986 | Preusker | 152/216 X |
| 4,618,300 | 10/1986 | Goebel | 411/433 |

Primary Examiner—Michael W. Ball
Assistant Examiner—Gregory J. Wilber
Attorney, Agent, or Firm—Toren, McGeady & Associates

[57] ABSTRACT

In order to be able to use an anti-skid device, particularly for vehicle wheels with pneumatic tires when driven on ice and snow, having a fixing disk, which can be attached to the wheel rim and which remains thereon even when the anti-skid device is not in use, and a supporting disk attachable to the fixing disk by a retaining ring and having a plurality of anti-skid arms engaging over the tire tread without great technical expenditure on a large number of vehicles, whose rims have different hole circles and pitches for the rim screws, the fixing disk with a shaped-on hub carries on its side remote from the supporting disk an adaptor disk, which is connected to the fixing disk by screw connections and which has a plurality of radially directed elongated holes in identical and/or several spacings or pitches.

14 Claims, 9 Drawing Sheets

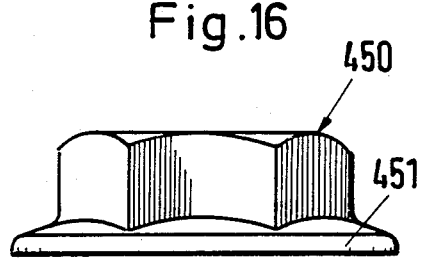
Fig. 16
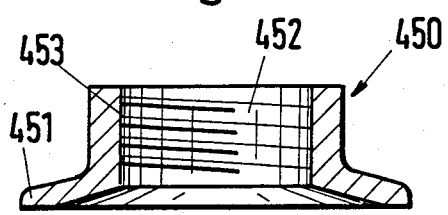
Fig. 17
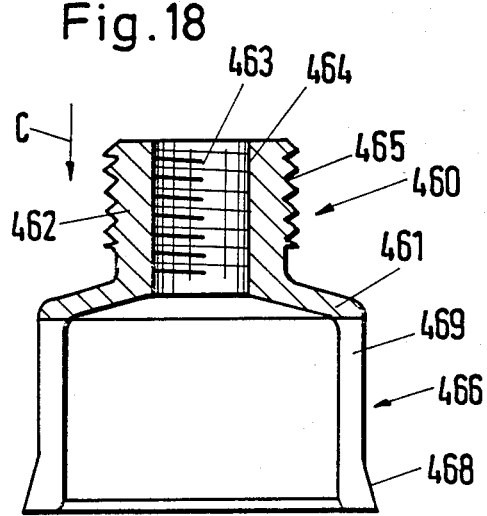
Fig. 18
Fig. 19
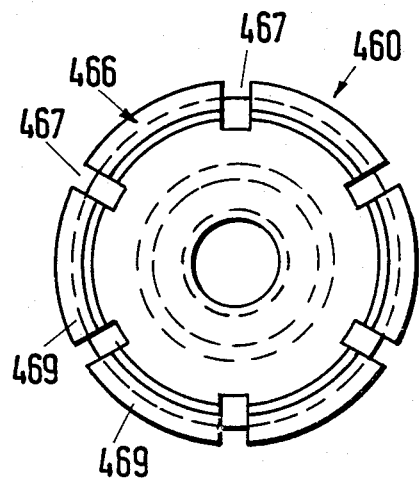
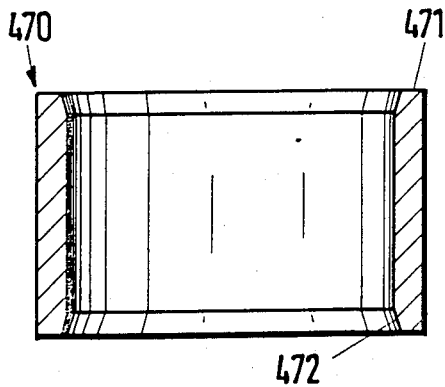
Fig. 20
Fig. 21
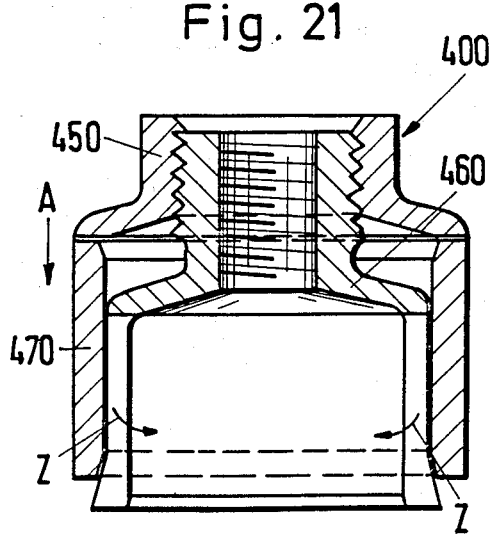

ADAPTOR FOR SCREWHEADS AND THE LIKE

This is a division of pending application Ser. No. 905,859 filed Sept. 10, 1986.

BACKGROUND OF THE INVENTION

The present invention relates to an anti-skid device, particularly for motor vehicles with pneumatic tires when driven on ice and snow, which comprises a fixing disk fastenable to the wheel disk or rim, which is provided with openings for fastening to rim screws, wheel studs or the like and a supporting disk held and lockable on the fixing disk by means of a retaining ring and which has a plurality of equidistant, radially disposed anti-skid arms formed from a pre-bent profile of plastic or some other suitable material, which overlap the tire tread and carry internally and externally at the free ends thereof a gripping profile, having spikes or metal bodies on the outside, as well as an adaptor for screwheads and the like.

Winter tires or so-called friction tyres are used when driving vehicles in winter on snow-covered uphill and downhill gradients. Snow chains are not very popular, because it is often difficult to fit them to the vehicle tires and they must be used in such a way that the road is not damaged, i.e. the snow chains have to be removed on dry road sections following the snow or ice-covered sections. In addition, when travelling on dry roads, snow chains are subject to a high degree of wear and do not permit high speeds. Particularly in the case of roads which become covered with ice at short notice, i.e. ice surfaces produced by drizzling rain falling on frozen road surfaces, snow chains and winter tires are often not available. It is also not always possible to use spiked tires. Apart from snow chains and winter tires starting aids are known, but cannot replace snow chains and winter tires. These starting aids, which comprise clamp straps mounted on the tires, merely serve to permit a vehicle to be driven a short distance out of mud or snow.

An anti-skid device, particularly for vehicle wheels with pneumatic tires when driven on ice and snow, which comprise a fixing disk which can be fastened to the wheel disk or rim and provided with openings for fastening to the rim screws, wheel studs and the like, together with a supporting disk held and lockable by means of a retaining ring on the fixing disk and having a plurality of equidistantly radially disposed anti-skid arms formed from a pre-bent profile made from plastic or another suitable material engaging over the tire tread and carrying externally and internally on their free ends a gripping profile, while having externally fitted spikes or metal bodies, is known from German utility model 83 27 385.

For attaching the supporting disk, this known anti-skid device has a fixing disk which can be connected to the wheel disk or rim and which is provided with lockable fastenings for the supporting disk, the fixing disk still remaining connected to the wheel disk or rim when the anti-skid device is not required. The supporting disk has a central opening, while the circular fixing disk centrally carries a circular hub having, a smaller diameter than the fixing disk, said hub having circumferentially at a distance from the fixing disk and adjacent to its upper edge, a plurality of bulge-like shoulder with sliding and guiding paths arranged below the same and tapering conically from the insertion openings in the direction of the hub circumference and which carry the supporting disk with the anti-skid arm surrounding the hub and which is secured by means of a retaining ring mounted on the hub, having locking webs insertable into the sliding and guiding paths of the hub and bringing about a bayonet-type locking, with conically tapering portions extending towards the insertion openings and having on its inner wall face at least one leaf spring-like latch which, in the locked position of the retaining ring of the fixing disk, engages in a recess in the hub circumference and is supported against undesired unlocking by a stop member and can be transferred by means of an unlocking key from the locking position into an unlocking position.

With such an anti-skid device, the fixing disk with the specially constructed hub always remains on the wheel disk or rim, while for the operating state of the anti-skid device, the supporting disk with the anti-skid arms is mounted on the fixing disk and is locked thereto by means of the retaining ring. In order to be able to fix the fixing disk to the wheel disk or rim, the fixing disk is provided with openings for fixing to rim screws, wheel studs or the like. For this purpose the fixing disk has a predetermined number of openings for attaching to rim screws, wheel studs, etc. It is disadvantageous that for stability and dimensional reasons, the fixing disk cannot have a plurality of differently arranged openings for receiving the rim screws or wheel studs, so as to be able to attach the fixing disk to wheel disks or rims where there are other dimensions and associations for the rim screws or wheel studs. However, it is not economic to keep in stock a large number of differently constructed fixing disks, so as to permit adaptability of the anti-skid device to the most varied wheel disks or rims. The attaching of the fixing disk to the wheel disks or rims takes place by means of rim screws or wheel studs.

For attaching such an anti-skid device, as well as wheel sleeve nuts, wheel split nuts, particularly shields and measuring devices, it is necessary to have a large number of special wheel screws and nuts with different threads, thread lengths, balls, cones, shuttles, flat collars, arbor tapers, width across flats and materials. Frequently the attaching elements change in the case of new vehicle types.

SUMMARY OF THE INVENTION

The invention solves the problem of so constructing an anti-skid device of the aforementioned type that without great technical expenditure can be used on numerous vehicles, even if their wheel disks or rims have different hole circles and spacings or pitches for the rim screws or wheel studs, so that there is no need to keep in stock a large number of differently constructed fixing disks for the individual wheel disk or rim types. It is also an object of the invention to provide an adaptor, which can be passed over rim screw heads, heads of screws of all types and nuts, there being only few widths across flats. This adaptor bridges relatively large tolerances of the widths across flats and ensures a reliable seating. It is easy to attach and no special tool should be necessary. It must also be easy to detach and frequently reusable.

To solve this problem an anti-skid device of the aforementioned type is proposed in which, according to the invention, the fixing disk with its shaped-on hub carries an adaptor disk on its side remote from the supporting disk and is connected to the fixing disk by means of screw joints and which has a plurality of radially directed elongated holes with identical and/or non-identical or several spacings or pitches.

According to a preferred embodiment of the invention, the adaptor disk has four elongated holes on the circular line adjacent to the center point. However, on the outer circular line there can also be six elongated holes. Of the six elongated holes on the outer circular line, three elongated holes are equidistantly formed in the adaptor disk, the distance between, in each case, two of these elongated holes being approximately 120° and the first of the three elongated holes is at a distance of approximately 75° from the axis passing through the center point of the adaptor disk, whilst of the other three elongated holes, the first elongated hole is at a distance of approximately 45° from the axis and the two other elongated holes running counterclockwise are arranged at a distance of approximately 90° in the adaptor disk, the, in each case, first and last elongated holes facing one another.

According to another embodiment of the invention, on a circular line facing the center point of the adaptor disk, there are provided five equidistant radial elongated holes and, on an outer circular line, five equidistant radially directed elongated holes, which are eccentric with respect to the first-mentioned elongated holes and displaced with respect thereto on the circular line. The first of the five elongated holes in the adaptor disk is at a distance of approximately 24° from the axis passed through the center of the disk, whilst the first of the elongated holes on the outer circular line adjacent to said first elongated hole is at a distance of approximately 47° from the axis in the adaptor disk. The elongated holes on the outer circular line have half the length of the elongated holes on the inner circular line. In addition, the adaptor disk has four or five equidistantly spaced threaded fixing disk fastening screw reception bores located on a circular line.

The advantage of using an adaptor disk on the fixing disk is that only a few fixing disk constructions are required. The adaptor disk has tapped holes coinciding with the fastening screw bores in the fixing disk and also a plurality of elongated holes, which are constructed radially in identical or different spacings or pitches in the adaptor disk, so that as a result of the large number of elongated holes provided in the adaptor disk, the fixing disk can be attached by means of the adaptor disk to any wheel disk or rim, because the large number of differently arranged elongated holes makes it possible to adapt to the different tapped holes for the rim screws or wheel bolts provided on the wheel disks or rims. Thus, there is no need to keep a large number of fixing disks for such anti-skid devices in stock, because, as a result of the elongated holes provided in the adaptor disk and having the same or different spacings or pitches, it is possible to adapt to wheel disks or rims with different associations and arrangements of the tapped holes for receiving rim screws or wheel studs. The adaptor disk is merely screwed in self-centering manner with the correct spacing or pitch on the rim screws, wheel studs or special wheel screws used with different pitch circle diameters. The fixing disk is then attached by means of screw joints to the adaptor disk, thereby making it possible to use the anti-skid device for vehicles for whose pitch circles and spacings or pitches no fixing disks are available.

Thus, it is possible with only a few adaptor disks and fixing disks to cover a maximum number of pitch circles and spacings or pitches on vehicle wheels, such as the known spacings or pitches or 3, 4, 5, 6, 8, 10, 11 and 12.

The invention relates to an anti-skid device, particularly for vehicle wheels with pneumatic tires when driven on ice and snow, which comprises a fixing disk attachable to the wheel disk or rim and having openings for attaching to the rim screws, wheel studs or the like and a supporting disk held and lockable on the fixing disk by means of a retaining ring having a plurality of equidistantly spaced, radially directed anti-skid arms formed from a pre-bent profile made from plastic or some other suitable material, which overlap the tire tread and are externally and internally provided on their free ends with a gripping profile, having spikes or metal bodies on the outside, an adaptor engaging over the head, such as a hexagon head or the like or an, e.g., wheel screw, bolt, nut, etc. is provided, which comprises a cap-like outer part and a cap-like inner part over which engages the outer part and having fixed and/or loose shaped or contour grippers, which are formed by longitudinal slots in the inner part wall in the form of holding clamp-like portions or as individual shaped bodies and by screwing or pressing the outer part over the inner part in the longitudinal direction of the screw, the shape grippers can be pressed against the bolts, nuts, etc., screwhead, etc. for forming a durable secure connection between the adaptor and the bolts, nuts or screwhead, the connection being detachable and reusable and in which by means of the adaptor foreign parts, such as e.g. the fixing disk of the anti-skid device can be connected to the bolts, nuts, screwheads, etc. by means of a tapped hole with screws.

With particular advantage, use is made of a construction in which the outer part of the adaptor adjacent to its lower all-around edge is provided on the inner wall side with a wall section tapering conically towards the edge and the inner part adjacent to its lower all-around edge has on the outer wall side a wall section conically widening towards the edge, the outer partial cone or taper pressing against the inner partial cone or taper when the outer and inner parts are joined. Adjacent to its lower all-around edge, the outer part can also be provided on the inner wall side with a wall section conically widening towards the edge and the inner part adjacent to its lower all-around edge can be provided on the outer wall side with a wall section conically tapering towards the edge, the outer partial cone or taper drawing against the inner partial cone or taper when the outer and inner parts are joined.

According to a further embodiment, the outer part of the taper is provided, in its lower area on the inner wall side, with a wall section widening conically towards the edge, said outer partial cone and a conical wall section on the inner part pressing against double cones of the loose shaped or contour grippers.

The invention also relates to an adaptor for bolts, nuts, heads of screws, such as wheel screws, e.g. for attaching the fixing disk or an anti-skid device, particularly for vehicle wheels with pneumatic tires when driven on ice and snow, which comprises a fixing disk attachable to the wheel disk or rim and provided with openings for attaching to rim screws, wheel studs or the like and a supporting disk held and lockable on the fixing disk by means of a retaining ring and having a plurality of equidistant radially directed anti-skid arms formed from a pre-bent profile made from plastic or some other suitable material engaging over the tire tread and provided externally and internally on their free ends with a gripping profile, while having spikes or metal bodies on the outside, in which the adaptor, engaging over the head, such as a hexagon head or the like of the rim screw or the like, comprises a cap-like outer part and a cap-like inner part over which engages the outer part with fixed and/or loose shaped grippers, the inner part wall being provided, for the formation of holding clamp-like sections, with longitudinal slots and shape grippers or are constructed as individual shaped bodies and by screwing or pressing the outer part over the inner part in the longitudinal direction of the screw the shape grippers are pressed against the bolts, nuts or the like, the screwhead, etc. for forming a durable, secure connection between the adaptor and the bolts, nuts or screwhead, the connection being detachable and reusable and by means of the adaptor foreign parts, such as e.g. the fixing disk of the anti-skid device can be connected to bolts, nuts, screwheads, etc. by means of a tapped hole with screws.

Thus, a holding clamp-like adaptor is obtained formed from two components, namely an inner part carrying at one end a tapped hole and an external thread. At the other end, the inner part has a holding clamp-like internal hexagon mount, which is slotted and is externally round with a shaped on cone. The outer part is provided at its end with a tapped hole, which matches the external thread of the inner part and has an external hexagon with the same width across flats as the internal hexagon of the inner part. At the other end, the outer part is provided with a countercone with respect to the inner part. On screwing the outer part over the inner part, the holding clamp-like internal hexagon mount is pressed together by the two cones and the adaptor, when placed over a hexagonal nut or a hexagon head of a screw is firmly and reliably connected thereto. By screwing back the outer part, the connection is detached again. The tapped hole in the inner part is used for attaching all possible components, such as e.g. the fixing disk of the anti-skid device to the adaptor by means of a screw. As the end of the inner part with the tapped hole projects over the outer part, the distance from the nut or screw is not modified by width across flat tolerances. As there are only few widths across flats, only a few adaptor types are required and have to be kept in stock for all types and makes of car.

BRIEF DESCRIPTION OF THE DRAWINGS

The invention is described in greater detail hereinafter relative to non-limitative embodiments and with reference to the attached drawings, wherein show:

FIG. 16 In side view and in a further embodiment, a nut which can be screwed on to the external thread of the neck-like portion the cap-like adaptor component.

FIG. 17 A vertical section through the nut of FIG. 16.

FIG. 18 A vertical section through the cap-like adaptor component with holding clamp-like shaped or contour grippers.

FIG. 19 A view from below of the component according to FIG. 18.

FIG. 20 A vertical section through the clamp collar mounted on the cap-like component.

FIG. 21 A vertical section of the adaptor comprising the nut, the cap-like component and the clamp collar.

DETAILED DESCRIPTION OF THE PREFERRED EMBODIMENTS

Figure 1:
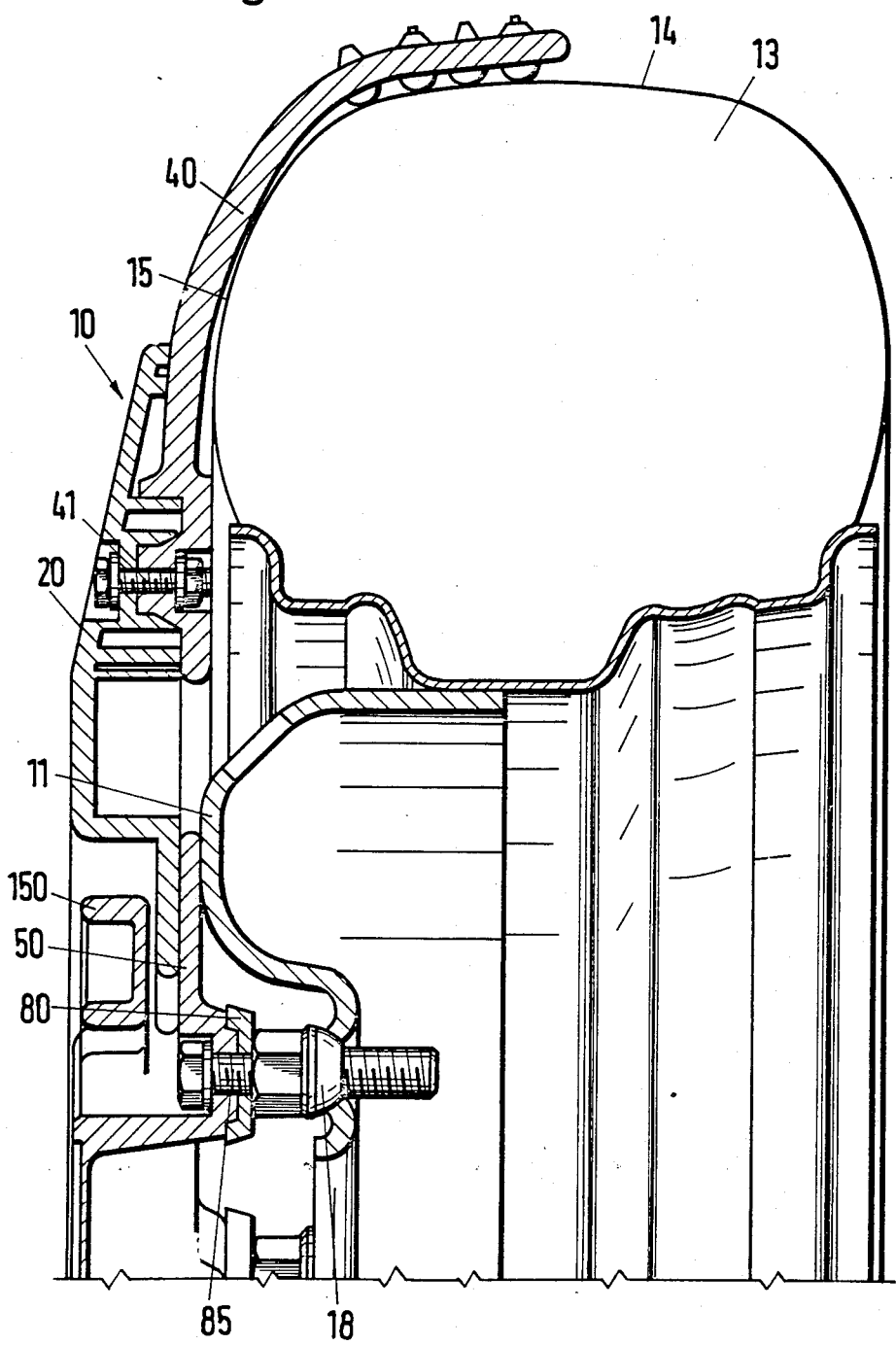
FIG. 1 A partially vertical section of a vehicle wheel with the anti-skid arms of an anti-skid device overlapping the tire tread.
Figure 2:
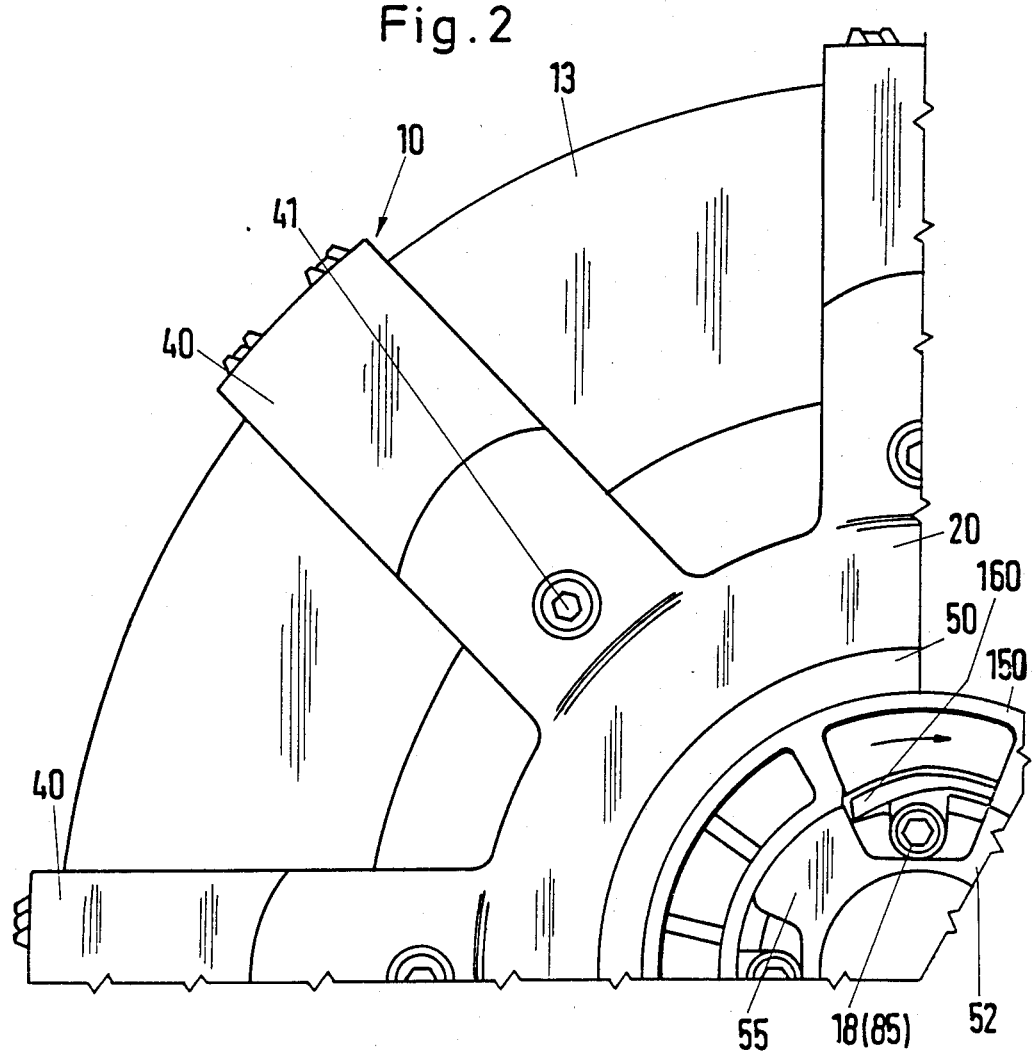
FIG. 2 A plan view of part of the supporting disk of the anti-skid device carrying the anti-skid arms.

As can be gathered from FIGS. 1 and 2, the anti-skid device 10 comprises an annular supporting disk 20 provided with a central opening to which are attached a plurality of radially oriented anti-skid arms 40, which are equidistantly spaced from one another and are pivotable in a small range about axes 41 parallel to the wheel disk bearing axis. This pivotability of the anti-skid arms 40 within a small range makes it possible when the vehicle is stationary to attach the anti-skid device 10. During the first revolutions of the vehicle wheel, the anti-skid arms 40 all assume an equidistant spacing, even if during attaching, in the region of the tire tread on a substrate, such as e.g. a road, the anti-skid arms are positioned laterally of the tire tread.

The anti-skid device is attached to a wheel provided with a tire 13 and which simultaneously represents the rim. Wheel 11 is provided with a brake part, which is not shown in the drawing. The tread area of tire 13 is designated 14 and the outside tire surface 15 (FIG. 1).

Each anti-skid arm 40 is attached to the supporting disk 20 by means of a stud-like or rivet-like connecting means. A detachable fitting of anti-skid arms 40 to supporting disk 20 is also possible, so as to be able to replace worn arms 40. As shown in FIG. 2, there are eight anti-skid arms 40 on supporting disk 20, but the number of such arms can be chosen at random. However, there must be at least two anti-skid arms. All anti-skid arms are at the same angular distance from one another. Each anti-skid arm 40 is made from a resilient elastic material, such as spring steel, so that an elastic bending down of the free edge portions of each anti-skid arm 40 is possible in the region of tread 14 of tire 13. The anti-skid arms 40 are pre-shaped in such a way that after attaching the anti-skid device 10 to a vehicle wheel, the arms overlap the tire tread 14 by their free ends. Other suitable materials can be used for making anti-skid arms 40, besides spring steel. Thus, the anti-skid arms 40 can be made from corresponding suitable plastics.

Figure 3:
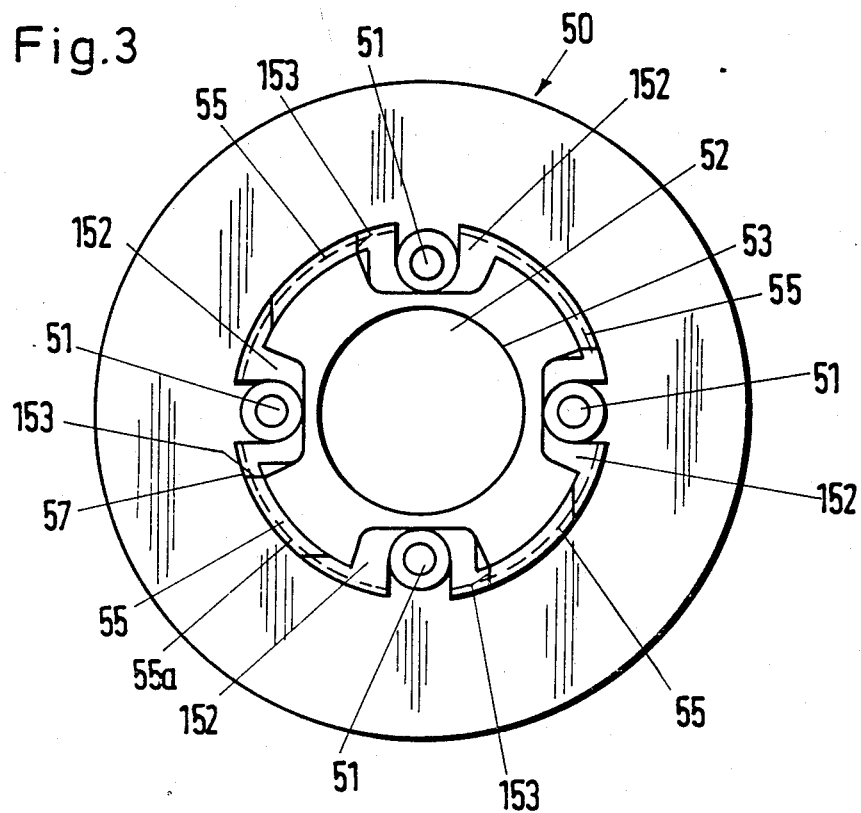
FIG. 3 A plan view of the fixing disk for the anti-skid device.
Figure 7:
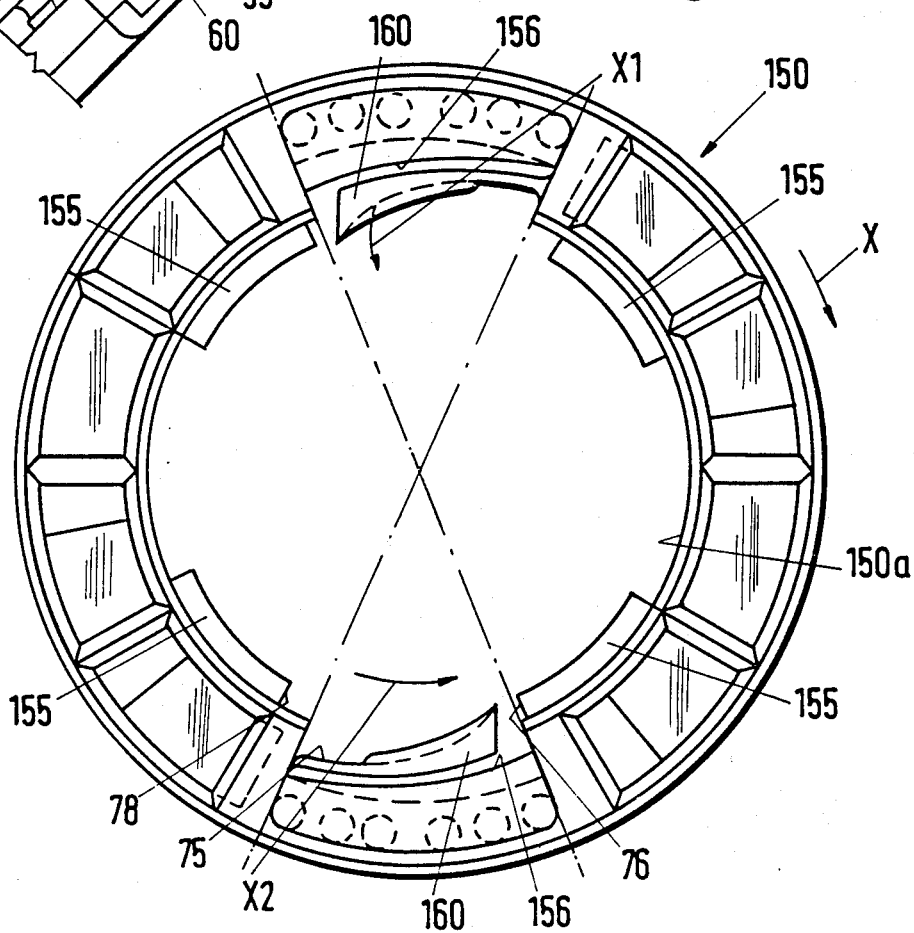
FIG. 7 A plan view of the retaining ring of the fixing means (fixing disk) for the anti-skid device.

On the free ends, anti-skid arms 40 are externally provided with gripping profiles, so that a good grip is obtained. These gripping profiles can also be constructed as spikes. The device for attaching the anti-skid device to the vehicle wheel rim 11 comprises a fixing disk 50 and a retaining ring 150 (FIGS. 3 and 7).

Fixing disk 50 is provided with a plurality of openings 51, which are used for attaching to the rim screws 18. As shown in FIG. 1, the rim screws 18 have bores with an internal thread for receiving fastening screws 18 and by means thereof fixing disk 50 can be attached to wheel rim 11. They can also be used for attaching the fixing disk 50 to the subsequently described adaptor disk or wheel screws or nuts.

The circular, fixing disk 50 is centrally provided with a cross-sectionally circular hub 52, which is constructed as a cylindrical shaped member and forms an integral part of fixing disk 50. The diameter of hub 52 is smaller than that of fixing disk 50.

On its outer circumference adjacent to the upper all-around edge 53, hub 52 has a plurality of bulge-like shoulders 55, which are equidistantly spaced. In the embodiment shown in FIG. 3, there are four bulge-like shoulders 55 projecting laterally from the hub circumference on hub 52 of fixing disk 50.

Below each bulge-like shoulder 55 is formed as a sliding and guiding path 60. the latter is constructed as a recess and has an insertion opening 56, on which the path 60 tapers conically towards the end area, so that the insertion opening 56 is larger than end area 56a. The recess forming the sliding and guiding path 60 then has a wedge-shaped configuration and is bounded in the area adjacent to fixing disk 50 by a torus 57. End area 56a of each sliding and guiding path 60 also has a limitation in the form of a stop member, although this is not absolutely necessary. Torus 57, which is shaped on to the outer circumference of hub 52, simultaneously constitutes the upper boundary for supporting disk 20 mounted on hub 52 of fixing disk 50 (FIG. 3). In the vicinity of the openings 51, said torus 57 is interrupted, because a part of each opening 51 passes as a partial bore into hub 52 (FIG. 3).

All sliding and guiding paths 60 below the bulge-like shoulders 55 are so constructed and arranged that their insertion openings 56 in each case face the preceding end area 56a. Each bulge-like shoulder 55 is advantageously provided in its upper region with a flattened portion 55a, in order to facilitate the mounting of retaining ring 150.

Hub 52 of fixing disk 50 receives the supporting ring 20 with anti-skid arms 40 of anti-skid device 10, as well as the retaining ring 150.

Figure 6:
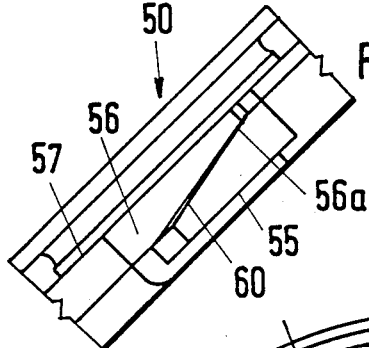
FIG. 6 A closure region of the fixing disk.

The securing of supporting disk 20 of anti-skid device 10 mounted on fixing disk 50 takes place by means of retaining ring 150. Retaining ring 150, which has an internal diameter somewhat smaller than the diameter of fixing disk 50 or same diameter as the latter, is provided on its inner wall surface 150a with a plurality of locking webs 155, whose number corresponds to the number of bulge-like shoulders 55, or the number of sliding and guiding paths 60, on hub 52 of fixing disk 50. These locking webs 155 are constructed in such a way that they can be inserted into the sliding and guiding paths 60, so that a bayonet-type locking action is obtained between retaining ring 150 and hub 52 of the fixing disk 50 (FIG. 7). Locking webs 155 have a wedge-shaped configuration, so that with retaining ring 150 mounted on fixing disk 50, the conically tapering end portions of each locking web 155 face the insertion openings 56 of the recess forming the sliding and guiding paths 60 between the bulge-like shoulder 55 and torus 57, so that on rotating retaining ring 150 about its vertical central axis in the direction of arrow X, locking webs 155 are introduced into the sliding and guiding paths 60, so that bayonet-like locking is achieved (FIGS. 6 and 7).

In order to be able to attach the retaining ring 150 to hub 52 of fixing disk 50 in such a way that the locking webs 155 of retaining ring 150 can be introduced into the sliding and guiding paths 60, locking webs 155 have a length corresponding to the distance between the two bulge-like shoulders 55 of fixing disk 50. In this way, the locking webs 155 can pass between, in each case, two bulge-like shoulders 55 when retaining ring 150 is in the attaching position and until said ring engages with torus 57 and locking webs 155 can be introduced into the recesses forming the sliding and guiding paths 60.

In order to prevent automatic detachment of retaining ring 150 from the hub 52 of the fixing disk 50, ring 150 is provided with additional arresting means constructed as leaf spring-like latches 160 in the form of resilient elastic tongues, which are arranged in recesses 156 on the inner wall face 150a of retaining ring 150. The arrangement and construction of these leaf spring-like latches 160 is such that when the retaining ring 150 is mounted on hub 52 of fixing disk 50 but is still in the unlocked position, latches 160 are pressed by bulge-like shoulders 55 on hub 52 into their recesses 156 on the inner wall face 150a of retaining ring 150. On locking retaining ring 150 by rotating it, the leaf spring-like latches 160 come to rest in the vicinity of recesses 152 formed on the circumference of hub 52. As latches 160 have the natural tendency to spring out of their recesses 156 in the direction of arrow X1, latches 160 come to rest in recesses 152 on hub 52 and form thereby the locking system, provided that the free ends of the leaf spring-like latches 160 engage with stop members 153, which define the recesses 152 in hub 52. The free ends of latches 160 engaging in these recesses with stop members 153 consequently ensure that retaining ring 150 is released counter to its rotation direction for locking and cannot be removed from hub 52.

There can be a random number of leaf spring-like latches 160 on the inner wall face 150a of retaining ring 150. In the embodiment of FIG. 7, there are two leaf spring-like latches 160, which are arranged equidistantly on the inner wall face 150a of retaining ring 150. The number of recesses 152 on the circumference of hub 52 of fixing disk 50 corresponds to the number of latches 160.

The leaf spring-like latches 160 are manufactured simultaneously with retaining ring 150, the latter being made from plastics with a resilient elastic behaviour in the case of tongue-like constructions and this also applies with respect to latches 160.

In place of the leaf spring-like latches 160, it is also possible to use differently constructed locking means. Thus, for example, it is possible to use radially displaceable, spring-loadable pins, which engage in corresponding recesses of the circumference of hub 52 of fixing disk 50. However, special precautions must be taken to prevent unlocking, in that the locking pins must be drawn back into their initial position to enable retaining ring 150 to be moved from fixing disk 50.

Figure 8:
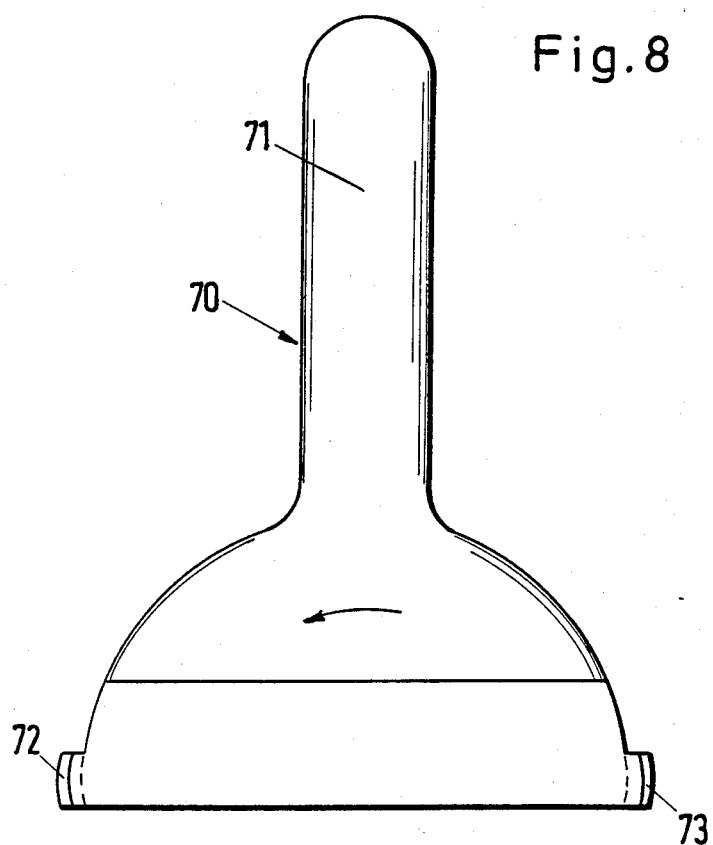
FIG. 8 A plan view of an unlocking key.
Figure 9:
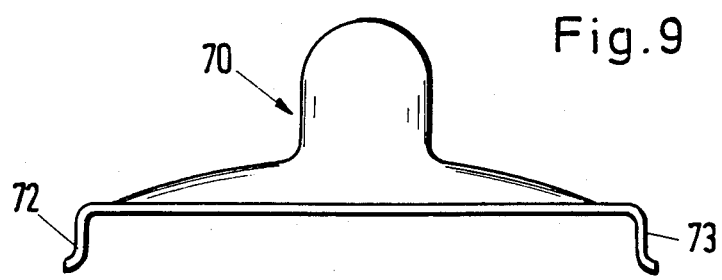
FIG. 9 A front view of the unlocking key.

To be able to remove retaining ring 150 from fixing disk 50, it is necessary to transfer the leaf spring-like latches 160 from their locking position into their initial position in recesses 156 on the inner wall face 150a of retaining ring 150. For this purpose, a locking key 70 (FIGS. 8 and 9) is provided and comprises a grip-like handle 71, on whose one free end there are two spaced pressure tongues 72, 73, which are arranged approximately perpendicularly to handle 71. The distance between these two pressure tongues 72, 73 corresponds to the spacing of the facing leaf spring-like latches 160, so that pressure tongues 72, 73 can be introduced into the two recesses 152 on fixing disk 50. According to FIG. 7, the two recesses 152 have additional recesses 75 on hub 52, into which can be introduced the two pressure tongues 52, 53 of unlocking key 70.

When pressure tongues 72, 73 of unlocking key 70 have been introduced into recesses 75 and key 70 is rotated in the direction of arrow X2 (FIG. 7), the two leaf spring-like latches 160 located in recesses 152 of hub 52 are forced out of said recesses 152 and moved into recesses 156 on the inner wall face 150a of retaining ring 150. Latches 160 are introduced into recesses 156 until, in the end area of the movement path of the two pressure tongues 52, 53, a stop member 76 is released and against which the two pressure tongues 72, 73 are engaged. Tongues 72, 73 have engaged with stop member 76 and unlocking key 70 is rotated further in the direction of arrow X2, then the pressure tongues 72, 73 also move retaining ring 150 and on further rotation move locking web 155 out of the sliding and guiding paths 60 of fixing disk 50 until locking webs 150 come to rest between the bulge-like shoulders 55, so that in this position it is possible to remove retaining rings 150 from hub 52.

The mounting of retaining ring 150 on hub 52 also takes place by means of unlocking key 70 by introducing pressure tongues 72, 73 of key 70 into recesses 75 and on turning key 70 in the direction of arrow X (FIG. 7), tongues 72, 73 move retaining ring 150 until locking webs 155 are located in the sliding and guiding paths 60 and the bayonet joint has been formed. In the attaching area of the leaf spring-like latches 160, recesses 75 have stop members 78 for the movement of retaining ring 150 by pressure tongues 72, 73 of unlocking key 70 (FIG. 7).

As shown in FIG. 1, on its wall face 50a remote from hub 52, fixing disk 50 is provided in the vicinity of rim screw or wheel stud openings 51 with spacing rings or spacers 80, which are constructed as interchangeable adaptors. This makes it possible by using spacing rings 80 of different sizes to adapt the fixing means to different tire sizes.

The fixing of an anti-skid device 10 comprising the supporting disk 20 with anti-skid arms 40 to the rims or wheel 11 of a vehicle using the fixing means comprising fixing disk 50 and retaining ring 150, takes place in such a way that after attaching the fixing disk 50 by means of locking screws 18, which are screwed into the wheel screws or nuts to wheel rim 11, the supporting disk 20 of the anti-skid device 10 is mounted on the hub 52 of fixing disk 50. Retaining ring 150 is then placed thereon, so that its locking webs 155 come to rest in the gaps between the bulge-like shoulders 55 on hub 52. This is followed by the introduction of pressure tongues 72, 73 of unlocking key 70 into recesses 75 and subsequent pivoting of said key 70 in the direction of arrow X (FIG. 7), so that retaining ring 150 is pivoted about its vertical central axis until locking webs 155 come to rest on the inner wall face 150a of retaining ring 150 in the recesses forming sliding and guiding paths 60. Simultaneously, the leaf spring-like latches 160 self-resiliently engage in the recesses 152 on hub 52, so that locking against unintentional detachment of retaining ring 150 takes place. Due to the fact that the free ends of the leaf spring-like latches 160 come to rest in stop member-like recesses 153, a reliable locking is ensured. Due to the fact that these stop recesses 153 are constructed in undercut manner and the free ends of latches 160 have an approximately wedge-shaped configuration, it is ensured that latches 160 with their free ends cannot spring out of the said recesses 153.

Thus, the anti-skid device 10 is secured on the vehicle wheel rim 11 by means of the fixing means formed by attaching disk 50 and retaining ring 150, so that the anti-skid arms 140 of anti-skid device 10 engage over the tire tread.

The anti-skid device 10 is removed with the aid of unlocking key 70, which is once again introduced into recesses 75 with its pressure tongues 72, 73. By pivoting unlocking key 70, the leaf spring-like latches 160 are moved out of their locking position into the initial position in the recesses 156 on the inner wall face 150a of retaining ring 150. Simultaneusly the latter is turned until locking webs 155 of said ring 150 have moved out of the sliding and guiding paths 60 on hub 52. It is then possible to raise retaining ring 150. This is followed by the removal of supporting disk 20 of anti-skid device 10 from hub 52 of fixing disk 50. In the case of further non-use of the anti-skid device 10, but while maintaining the attaching means is ready for use, retaining ring 150 is merely mounted and locked on fixing disk 50, so that it is always possible to fit the anti-skid device 10, should this be necessary.

Supporting disk 20 of anti-skid device 10 is provided with a central opening, so that disk 20 can be mounted on hub 52 of fixing disk 50. The diameter of this central opening is larger than the diameter of hub 52, so that the supporting disk 20 of anti-skid device 10 held on hub 52 can perform eccentric movements. It is possible in this way for the anti-skid arms 40 engaging over the tyre tread in conjunction with supporting disk 20 to adapt to the squeezing movements of the revolving tire. The diameter of the central opening in supporting disk 20 is also dimensioned in such a way that said disk 20 can be guided by means of torus 57 on hub 52. The upwards securing of supporting disk 20 takes place by means of retaining ring 150, which sectionally overlaps said disk, while fixing disk 50 exercises the necessary securing action towards the rim.

Figure 4:
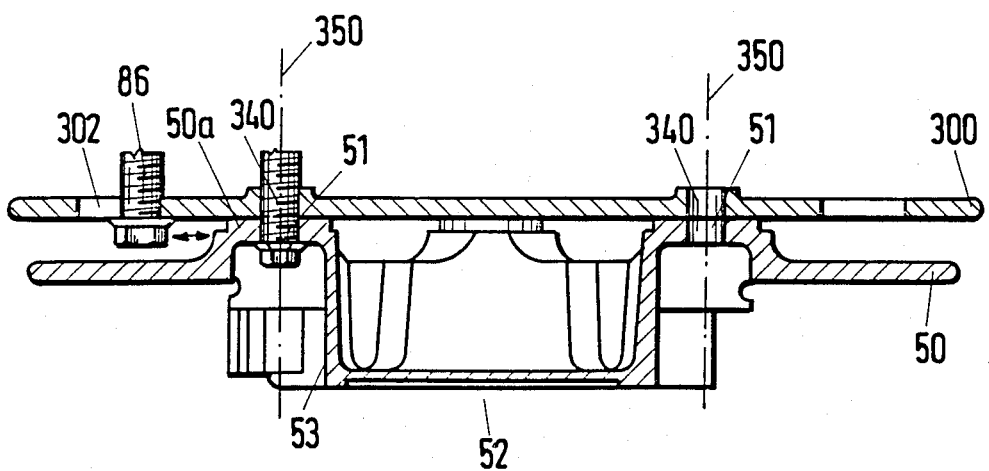
FIG. 4 A vertical section through the fixing disk with the adaptor disk.
Figure 5:
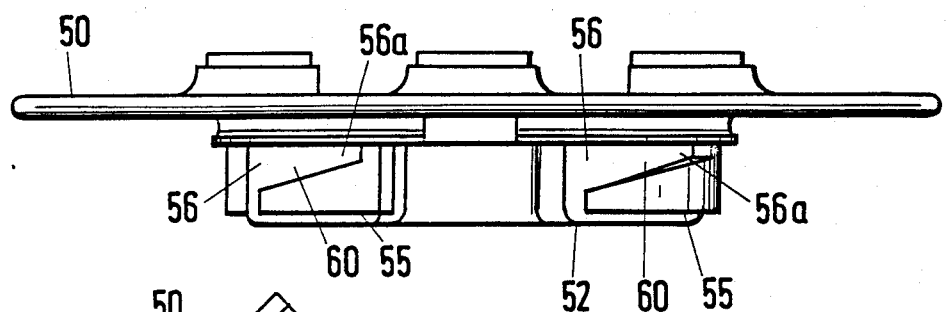
FIG. 5 A side view of the fixing disk without adaptor disk.

In order to be able to attach the fixing disk 50 with its hub 52 to the wheel disk or rim of a vehicle, the side of fixing disk 50 remote from supporting disk 20 is provided with an adaptor disk 300, which is connected by means of screw connections 350 to hub 52 of fixing disk 50. For fastening adaptor disk 300 to hub 52 of fixing disk 50, according to FIG. 10, adaptor disk 300 has a plurality of fixing disk fastening screw reception bores 340 located on a circular line 341 about the center point M of adaptor disk 300 and said bores are aligned with bores 51 (FIGS. 3 and 4) of hub 52 of fixing disk 50. The number of bores 340 corresponds to the number of bores 51 in hub 52. These fixing disk fastening screw reception bores 340 are arranged equidistantly. In the case of the embodiment shown in FIGS. 3 and 10, there are four reception bores 340 in adaptor disk 300, whereas in the embodiment shown in FIG. 11 there are five reception bores 340 on circular line 341. The number of said bores 340 is a function of the size of fixing disk 50 with its hub 52. Reception bores 340 are provided with an internal thread, so that after inserting the corresponding screws, the fixing disk 50 mounted on adaptor disk 300 can be detachably connected to the latter.

Figure 10:
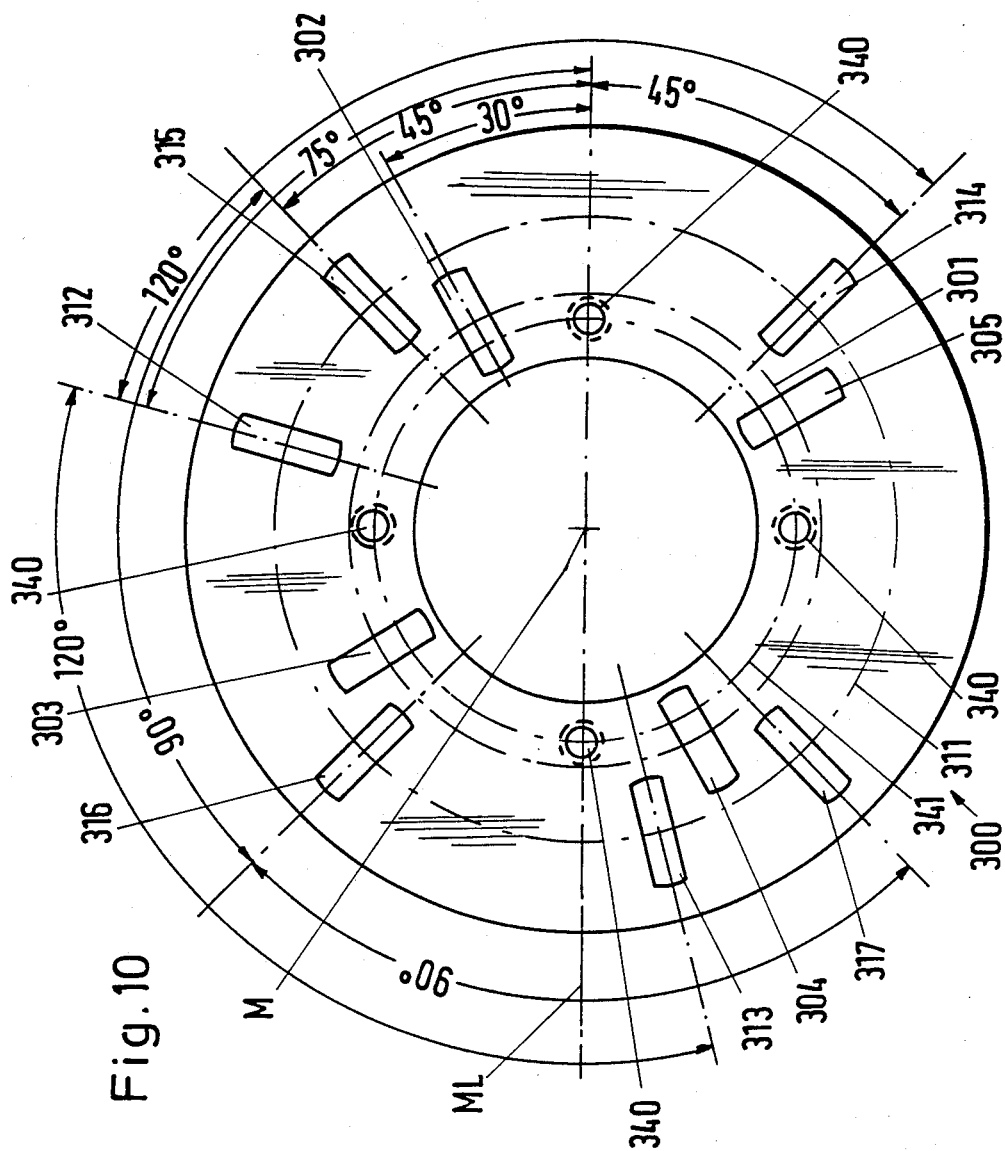
FIG. 10 A plan view of an adaptor disk.

Adaptor disk 300 has a plurality of radially directed elongated holes 302, 303, 304, 305 and 312, 313, 314, 315, 316, 317, said elongated holes being constructed in adaptor disk 300 with identical or nonidentical and numerous spacings or pitches (FIG. 10).

In the case of the adaptor disk 300 shown in FIG. 10, the elongated holes are distributed over two circular lines with different diameters. Elongated holes 302 to 305 are equidistantly spaced from one another on the circular line 301 adjacent to center M of adaptor disk 300, while elongated holes 312 to 314 and 315 to 317 are in part non-equidistantly spaced on the outer circular line 311. On the circular line 301 adjacent to center M of adaptor disk 300, there are four elongated holes, whereas there are six elongated holes on the outer circular line 311.

The arrangement of the elongated holes 302 to 305 on inner circular line 301 is such that the first elongated hole 302 is at a distance of approximately 30° from the axis ML placed through the adaptor disk center M. Of the six elongated holes 312 to 314 and 315 to 317 on the outer circular disk 31 of adaptor disk 300, elongated holes 312, 313, 314 are equidistantly arranged. This spacing is approximately 120° between elongated holes, the first elongated hole 312 beginning at a distance of approximately 75° from axis ML. The spacing of the following elongated holes 313, 314 is approximately 120° between them.

The further elongated holes 315, 316, 317 on the outer circular disk 311 are arranged in adaptor disk 300 in the following way. The first elongated hole 315 is at a distance of approximately 45° from axis ML. In counterclockwise direction, it is followed by elongated holes 316, 317 the distance between hole 315 and hole 316 and the distance between hole 316 and hole 317 is approximately 90°, the two holes 315, 317 facing one another. This leads to the distribution and arrangement of elongated holes 302 to 305, 312 to 314 and 315 to 317 in adaptor disk 300 shown in FIG. 10.

Figure 11:
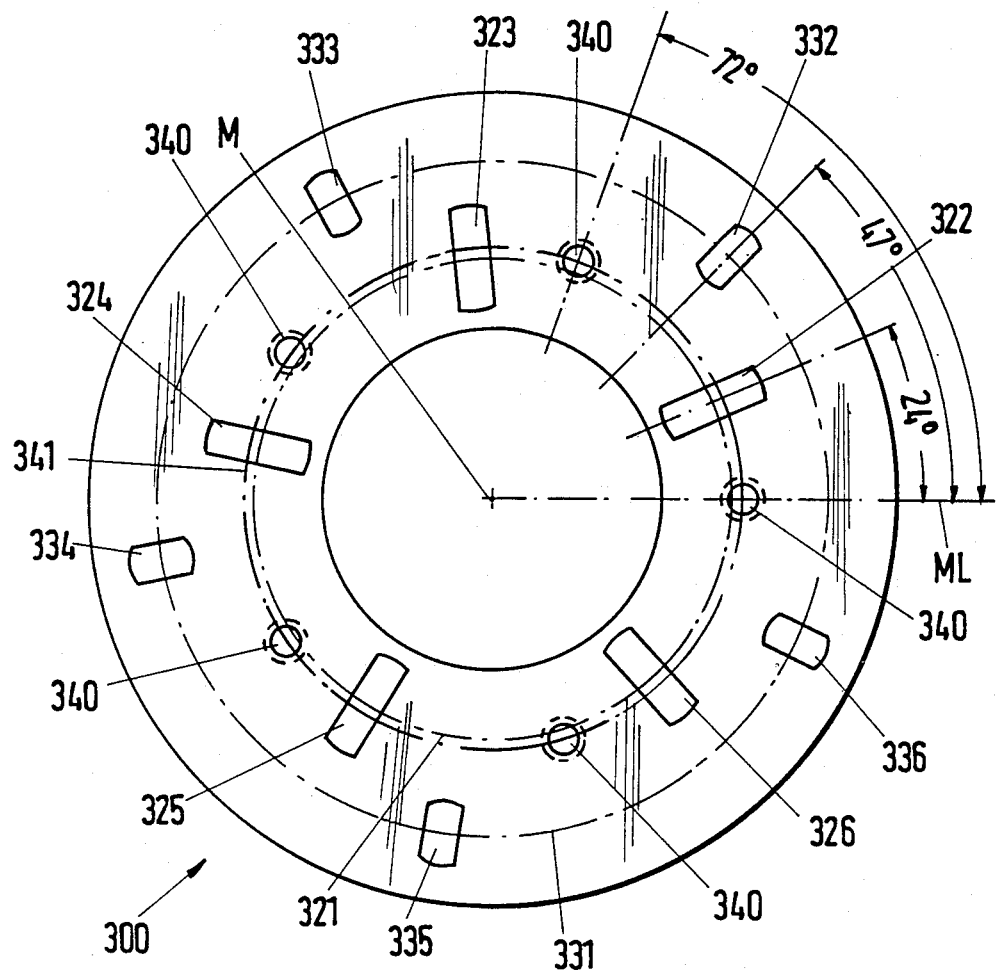
FIG. 11 Another embodiment of an adaptor disk.

In the further embodiment of an adaptor disk 300 shown in FIG. 11, on a circular line 321 facing center M of the adaptor disk there are five radially disposed elongated holes 322, 323, 324, 325, 326, which are equidistantly spaced, whereas on an outer circular line 331 there are five further elongated holes 332, 333, 334, 335, 336 in the adaptor disk and these are also equidistantly and radially disposed. However, elongated holes 322 to 326 are displaced by a portion with respect to the other elongated holes 332 to 336. The first of the elongated holes arranged on the inner circular line 321, i.e. elongated hole 322 is arranged at a distance of approximately 24° from the axis ML placed through the adaptor disk center M. This is followed in equidistantly spaced manner by the further elongated holes 323 to 326. However, the first elongated hole 332 of the elongated holes located on the outer circular line 331 starts at a distance of approximately 47° from axis ML, the other elongated holes 333 to 336 following in equidistantly spaced manner. The fixing disk fastening screw reception bore 340 on circular line 341 are so arranged with respect to elongated holes 322 to 326 and 332 to 336, that the first bore 340 is on axis ML and then the in each case following bore is at a distance of approximately 72° from, in each case, the preceding bore. In the case of adaptor disk 300 according to FIG. 11, elongated holes 332 to 336 are shorter than elongated holes 322 to 326. Elongated holes 332 to 336 are roughly half as long as elongated holes 322 to 326. In the case of adaptor disk 300 according to FIG. 10, all the elongated holes are of the same length. The arrangment of the elongated holes on their circular lines is such that the circular lines pass through the centers of the elongated holes.

Adaptor disk 300 is made from metallic, and in particular, corrosion-proof materials, but it can also be produced from other suitable materials, particularly those having a high strength.

The elongated holes in adaptor disk 300 are so arranged with respect to the threaded circular openings that the fixing disk supports 50A (FIG. 4) or spacers (FIG. 1) do not impede with the fastening screws 86 in the elongated holes of the adaptor disks. The adaptor disk 300 can also have a plurality of spacings or pitches. The wheel screws or nuts are not passed through the fixing disk 50 and instead are located behind the latter and are screwed to the fixing disk or adaptor disk 300 by locking screws. The inside adhesion of the anti-skid arms on the tire tread by the profile bodies provided on the free ends of the anti-skid arms and which engage in the tire tread profile are particularly advantageous.

In order to be able to fix the anti-skid device 10 to a vehicle wheel rim 11, it is necessary for the fixing disk 50 of the anti-skid device to be connected to the rim. This takes place by means of rim screws, but they must have a special construction, so as to be able to receive the actual locking screws 85 for fixing disk 50. It is therefore necessary to use rim screws, which have a special design to permit fixing of the fixing disk 50. To this end, usually specially constructed rim screws are used and due to the large number of vehicle types, it is necessary to keep available a large number of wheel rim screws, so as to be able to use the anti-skid device on different vehicle models.

Through the use of an adaptor 400, as shown in FIGS. 12 to 21, it is possible to use existing rim screws and, by means of the adaptor, to fasten the locking screws used for securing the fixing disk 50. The different embodiments of adaptor 400 are constructed in such a way that the adaptor mounted on the screwhead of a rim screw produces the connection between the latter and the fixing disk locking screw 85. As adaptor 400 can be used in matched manner for the different rim screws, bolts or nuts, there is no need to manufacture and keep in stock a large number of adaptors and instead it is adequate to keep available e.g. three adaptor sizes. Surprisingly with these three adaptor sizes, it is possible to cover all rim screws of known vehicle models. Adaptor 400 engages round or over head 435, such as hexagon head or the like, of a rim screw 434 or a nut or the head of a wheel stud.

Figure 12:
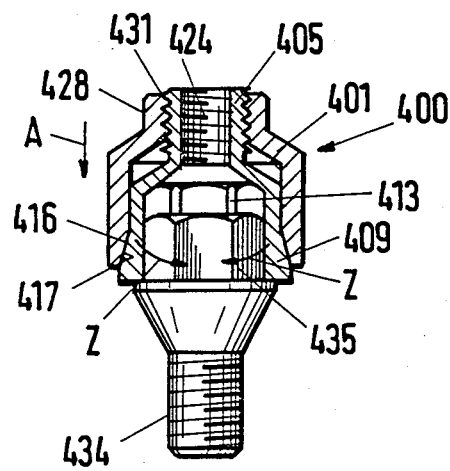
FIG. 12 Partly in elevation and partly in vertical section, an adaptor arranged on a wheel fixing screw in an embodiment in which the conically constructed wall surface portions of the outer and inner parts press against one another.

In the embodiment shown in FIG. 12 adaptor 400 comprises a cap-like outer part 401 and a cap-like inner part 405 overlapped by the outer part. Outer part 401 is screwed over inner part 405 by means of a thread 431. As can be gathered from FIG. 12, the inner part 405 has a neck-line, drawnin, upper shoulder, which is provided with an external thread, while the upper neck-like drawn in portion of outer part 401 has an internal thread, so that outer part 401 can be screwed over inner part 405 by means of thread 431. Adjacent to its lower, all-round edge, outer part 401 is provided on the inner wall side with a wall section 416 tapering conically towards the edge, while adjacent to its lower all-round edge, inner part 409 is provided on the outer wall side with a wall section 417 conically widening towards the edge, so that in the joined state of outer part 401 and inner part 405, the conical wall surface 416 is pressed against the conical wall surface 417.

The cap-like portion of inner part 405 has a plurality of arm-like shape or contour grippers 409, which are separated from one another by means of vertically directed slots 413 in the inner part wall surface, said grippers 409 being fixed by their upper ends to the shaped member of inner part 405. As a result of this slot configuration, the shape grippers 409 are to a certain extent movable, i.e. elastic and on screwing outer part 401 on to inner part 405 are pressed against head 435 of screw 434 in such a way that a firm seat of adaptor 400 on screwhead 435 is ensured. The mounting of inner part 405 of adaptor 400 on the screwhead by means of shaped grippers 409 takes place in clamp-like manner, so that grippers 409 are kept under press fit by means of the overengaging outer part 401 and firmly engage on screwhead 435. If it is assumed that screwhead 435 of screw 434 is a hexagon head, then both inner part 405 and outer part 401 are correspondingly profiled and hexagon-like, so that an overlapping or engaging over of screwhead 435 is ensured, the shaped grippers 409 having a certain elasticity or mobility than engaging on the outer faces of the hexagon screwhead. The number of slots 413 on inner part 405 is selected in such a way that six arm-like shaped grippers 409 are formed. However, the outer and inner parts need not be hexagonal.

If the outer part 401 is inverted over inner part 405 and screwed on to the latter, then outer part 401 moves in the direction of arrow A and the conically constructed, all-round wall section 416 moves inwards the conically constructed wall section 417 of the shaped grippers 409, so that the latter are pressed in arrow direction Z on to screw head 435. For actuation purposes, outer part 401 is also externally provided with a hexagon head 428, which is advantageously identical to hexagon head 435 of rim screw 434, so that no special actuating tool is required for screwing outer part 401 on to inner part 405. Inner part 405 is centrally provided in the longitudinal direction of the screw with a tapped hole 424, which is shown for receiving a screw not shown in the drawing, by means of which foreign parts, such as e.g. fixing disk 50 of anti-skid device 10 can be fixed thus, the adaptor 400 is held on the screw head 435 of screw 434 under bracing fit. By turning in the opposite direction outer part 401 can be unscrewed from inner part 405, so that adaptor 400 can be raised from screw head 435 of screw 434.

Figure 13:
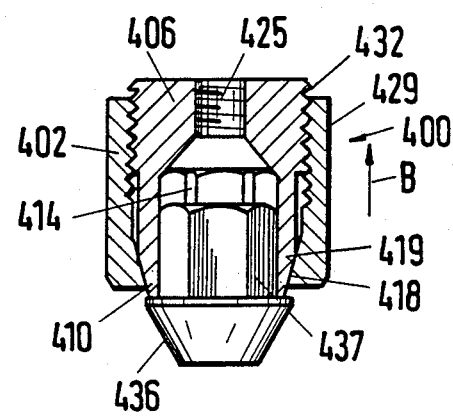
FIG. 13 Partly in elevation and partly in a vertical section, an adaptor arranged on a wheel fastening screw in an embodiment in which the outer partial cone is drawn against the inner partial cone.

FIG. 13 shows an embodiment of an adaptor 400, in which the outer part 402 is drawn against cone 419 of inner part 406 by a drawing cone 418 when outer part 402 is screwed by means of thread 432 on to the inner part 406 in the direction of arrow B. The movable shape grippers 410 formed by slots 414 in the inner part wall are pressed against hexagon head 437 of wheel nut 436. Externally the outer part 402 is provided with a hexagon 429 and a connecting tapped hole 425 is provided in inner part 406. Adjacent to its lower, all-round edge, outer part 402 is provided on the inner wall side with a wall surface 418 narrowing conically towards the edge, while adjacent to its lower, allround edge, inner part 406 is provided on the outer wall side with a wall surface 419 tapering conically towards the edge, so that when outer part 402 and inner part 406 are joined, the conical wall surface 418 is drawn against the conical wall surface 419, the shaped grippers 410 being pressed against the screw head.

Figure 14:
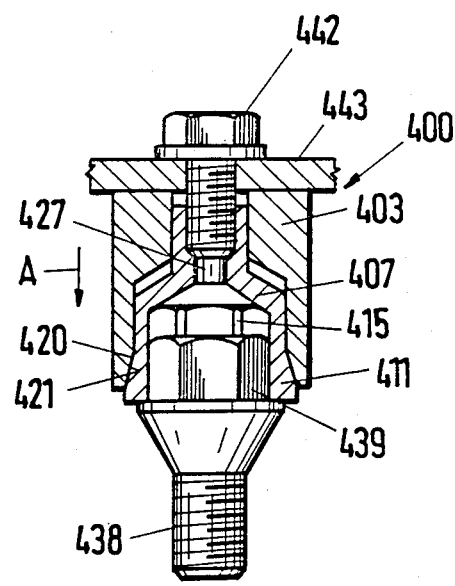
FIG. 14 Partly in elevation and partly in a vertical section, an adaptor arranged on a wheel fastening screw in an embodiment in which the outer part is drawn over the inner part.

FIG. 14 shows an embodiment of an adaptor 400, in which a circular outer part 403 is provided with an inside, conical wall surface 420, which presses against the conical wall surface 421 of inner part 407 if, during the attaching of a device 443 outer part 403 is moved in arrow direction A over inner part 407 during the tightening of screw 442 in the reception thread 427. Thus, also in this embodiment, shaped grippers 411 formed on inner part 407, which are constituted by vertically directed slots in the inner wall part and are therefore movable, i.e. downwardly bendable, are pressed against the hexagon head 439 of rim screw 438. The overlapping, all-round edge regions of outer part 403 and inner part 407 have a conical inner/outer surface configuration, as is also provided in the embodiment according to FIG. 12.

Figure 15:
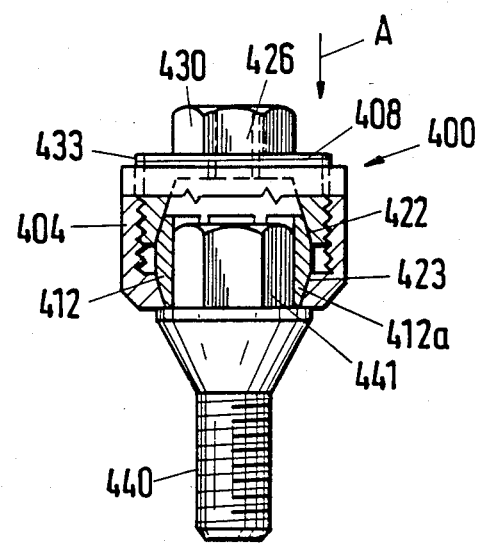
FIG. 15 Partly in elevation and partly in vertical section, an adaptor arranged on a wheel fastening screw in an embodiment in which a double cone with loose gripping members is provided.

In the embodiment of an adaptor 400 shown in FIG. 15, an inner part 408 is provided with an actuating hexagon 430 and a reception tapped hole 426, which by screwing in over thread 433 in outer part 404 in the direction of arrow A brings together the two conical inner wall surfaces 422, 423 and presses the shaped grippers 412, 412a against the hexagon head 441 of wheel screw 440 provided on inner part 408 in the same way as in the previously described embodiments. As can be seen from FIG. 15, a double conicity is provided, namely firstly in the lower inner wall region of the outer part and secondly in the lower inner wall region of the inner part, which is shorter than the outer part.

If the outer parts 401, 402, 403, 404 are moved oppositely to arrow directions A, B with respect to inner parts 405, 406, 407, 408, then the shaped grippers 409, 410, 411, 412, 412a are detached from the hexagon surfaces of hexagon head 435, 437, 439, 441 of a rim screw, nut or bolt head.

The construction of the adaptor 400 is not restricted to the form represented and described relative to FIGS. 12 to 15. It is a function of the intended use of the adaptor. Thus, the adaptor can not only be used in the motor vehicle field, but wherever two connecting elements are to be non-positively connected.

Another embodiment of an adaptor is shown in FIG. 21 and comprises a nut 450, a cap-like component 460 and a sleeve 470. At the bottom, nut 450 is provided with an all-round edge 451 and has a longitudinal bore 452 and an internal thread 453 (FIGS. 16 and 17). Longitudinal bore 452 is dimensioned in such a way that the nut 450 can be screwed on to the hereinafter described adaptor component 460.

According to FIGS. 18 and 19, cap-like component 460 comprises a shaped body with an upper, drawn-in, neck-like section 462, which is provided with a central longitudinal bore 463, which has an internal thread indicated at 464. 465 indicates an external thread. The diameter and dimensions of neck-like section 462 are such that the nut 450 shown in FIGS. 16 and 17 can be screwed on to said section 462 of component 460. The internal bore 463 of component 460 is used for receiving a not shown fixing or locking screw for securing part of the device or a fixing disk 50 for fastening the previously described anti-skid device.

The neck-like section 462 of component 460, accompanied by the formation of an all-round shoulder 461, passes into a cap-like section, whose wall surface 466 is provided with a plurality of longitudinal slots 467, so that an arm-like shape gripper 469 is constructed between each two longitudinal slots. Wall surface 466 with the shaped grippers 469, with respect to the construction of the shaped grippers 409, 410, 411, 412, 412a corresponds to the adaptor embodiment shown in FIGS. 12 to 15. Shaped grippers 469 have certain mobility due to the material used and, as described hereinafter, can be moved in arrow direction Z after tightening nut 450 and fitted sleeve 470 (FIG. 20), so that after fitting its component 460, the adaptor can be securely held on a hexagon screw, not shown in the drawing, and is so fixed to the hexagon screw head that removal or automatic detachment is not possible.

After mounting sleeve 470 on component 460, as shown in FIG. 21, nut 450 is screwed on to the neck-like section 462 of component 460, the all-round edge 451 of nut 450 resting on the upper, all-round edge 471 of sleeve 470. By tightening, i.e. further screwing in of nut 450, sleeve 470 is moved downwards in the direction of arrow C, so that as a result of the conical construction of the lower edge regions, the shaped grippers 469 are pressed in arrow direction Z against the surfaces of the hexagon screw on which the adaptor is to be fixed. To bring this about, the shaped grippers 469 are provided in their lower edge regions with an all-round wall section 468, which widens conically outwards. The lower, all-round edge 472 of the mounted sleeve 470 then engages on the sloping wall surface 468 of component 460 and during a further vertical downward movement of sleeve 470, shaped grippers 469 are pressed on to the hexagon head of a screw due to the resulting contact pressure. The all-round engagement edge 472 of sleeve 470 can, as shown in FIG. 20, be constructed in outwardly chamfered manner, in order to ensure perfect sliding of the lower all-round edge of sleeve 470 on the conical wall surface 468 of component 460 when sleeve 470 is moved downwards in arrow direction C on tightening nut 450. Due to the fact that sleeve 470 is annular, the wall surface thereof constitutes a counter pressure surface on placing on shaped grippers 469, so that the wall surface 470 cannot give way to the pressure of the shaped grippers 469 and instead the shape grippers are moved in the direction of arrow Z for pressing against the hexagon head. The inner wall surface of the sleeve 470 is formed in outwardly directed conically tapered manner within the region of the upper and/or lower circular edge.

The cap-like section of component 460 can, as shown in FIG. 19, be circular, but it is also possible to choose a cross-sectional configuration corresponding to the shape of a hexagon head. The circular form of the cross-section of a shaped body 460 leads to the advantage that the latter can be mounted not only on screws with a hexagon head, but also on heads having a different shape. It is surprising that as a result of the design of adaptor 400, it is firmly placed on each head shape and particularly hexagon heads in such a way that it is not possible to remove or detach the adaptor from the hexagon head of a screw.

The individual parts of adaptor 400 are made from metallic materials. The mobility or the possibility of easy bending down and springing back into the initial position of shape or contour grippers 409, 410, 411, 412, 412a and 469 is achieved as a result of an appropriate material selection. The materials can be suitable steel types, particularly steel with resilient elastic characteristics such as sheet metal, but other suitable materials can also be used. The caplike section of component 460 has the shape of a cylinder being open at the bottom side and the cylinder wall of which provides for the longitudinal slots 467, the outer wall surface of the cylinder extending in conically expanding manner in outward direction towards the edge near to the bottom.

Either of the inner part and the outer part can also be provided with a mount for a lock to secure the connection between the adaptor and the bolt.

What is claimed is:

1. An adaptor for bolts, nuts or rim screw heads for mounting a fixing disk of an anti-skid device, particularly for vehicle wheels carrying pneumatic tires when driven on ice and snow, said anti-skid device having a fixing disk attachable to the wheel rim and provided with openings for attaching to rim screws or wheel studs, and a supporting disk held and lockable on the fixing disk by means of a retaining ring and having a plurality of equidistant radially directed anti-skid arms formed in a prebent profile from plastic or some other suitable material engaging over the tire tread and provided externally and internally on their free ends with a gripping profile, while having spikes or metal bodies on the outside, wherein the adaptor engaging over the head of a bolt, nut or rim screw comprises a cap-shaped outer part and a cap-shaped inner part, the outer part having fixed grippers for engaging over the inner part, the inner part being provided with a wall, for the formation of holding sections, with longitudinal slots and shape grippers and one of said outer part and said inner part having a tapped hole longitudinally formed therein, whereby, by screwing or pressing the outer part over the inner part in the longitudinal direction of the bolt, rim or rim screw, the shape grippers are pressed against a bolt, nut or rim screw head, for forming a durable, secure connection between the adaptor and the bolt, nut or rim screw head, the connection being detachable and reusable and, by means of the adaptor, different parts can be connected to the bolt, nut, or rim screw head by means of a screw engaging the tapped hole, the outer part of the adaptor having an all-around edge and being provided, on an inner wall side adjacent to said all-around edge, with a first wall surface tapering conically towards the edge, and the inner part has a lower all-around edge and is provided, adjacent to said lower all-around edge on an outer wall side, with a second wall surface conically widening towards the edge, whereby, when the outer and inner parts are joined together, the first conical wall surface presses against the second conical wall surface.

2. An adaptor for bolts, nuts or rim screw heads for mounting a fixing disk of an anti-skid device, particularly for vehicle wheels carrying pneumatic tires when driven on ice and snow, said anti-skid device having a fixing disk attachable to the wheel rim and provided with openings for attaching to rim screws or wheel studs, and a supporting disk held and lockable on the fixing disk by means of a retaining ring and having a plurality of equidistant radially directed anti-skid arms formed in a prebent profile from plastic or some other suitable material engaging over the tire tread and provided externally and internally on their free ends with a gripping profile, while having spikes or metal bodies on the outside, wherein the adaptor engaging over the head of a bolt, nut or rim screw comprises a cap-shaped outer part and a cap-shaped inner part, the outer part having fixed grippers for engaging over the inner part, the inner part being provided with a wall, for the formation of holding sections, with longitudinal slots and shape grippers and one of said outer part and said inner part having a tapped hole longitudinally formed therein, whereby, by screwing or pressing the outer part over the inner part in the longitudinal direction of the bolt, nut or rim screw, the shape grippers are pressed against a bolt, nut or rim screw head, for forming a durable, secure connection between the adaptor and the bolt, nut or rim screw head, the connection being detachable and reusable and, by means of the adaptor, different parts can be connected to the bolt, nut, or rim screw head by means of a screw engaging the tapped hole, the outer part of the adaptor having a lower all-around edge and is provided, adjacent to the lower all-around edge on an inner wall side, with a first wall surface conically widening towards the edge, and the inner part has a lower all-around edge and is provided, adjacent to the lower all-around edge on an outer wall side, with a second wall surface conically tapering towards the edge, whereby, when the outer and inner parts are joined, the first conical wall surface is drawn against the second conical wall surface.

3. An adaptor for bolts, nuts or rim screw heads for mounting a fixing disk of an anti-skid device particularly for vehicle wheels carrying pneumatic tires when driven on ice and snow, said anti-skid device having a fixing disk attachable to the wheel rim and provided with openings for attaching to rim screws or wheel studs, and a supporting disk held and lockable on the fixing disk by means of a retaining ring and having a plurality of equidistant radially directed anti-skid arms formed in a prebent profile from plastic or some other suitable material engaging over the tire tread and provided externally and internally on their free ends with a gripping profile, while having spikes or metal bodies on the outside, wherein the adaptor engaging over the head of a bolt, nut or rim screw comprises a cap-shaped outer part and a cap-shaped inner part, the outer part having fixed grippers for engaging over the inner part, the inner part being provided with a wall, for the formation of holding sections, with longitudinal slots and shape grippers and one of said outer part and said inner part having a tapped hole longitudinally formed therein, whereby, by screwing or pressing the outer part over the inner part in the longitudinal direction of the bolt, nut or rim screw, the shape grippers are pressed against a bolt, nut or rim screw head, for forming a durable, secure connection between the adaptor and the bolt, nut or rim screw head, the connection being detachable and reusable and, by means of the adaptor, different parts can be connected to the bolt, nut, or rim screw head by means of a screw engaging the tapped hole, a lower region of the outer part on an inner wall side being provided with a wall surface conically widening towards an edge of the outer part, this conical wall surface and a conical wall surface on the inner part being pressed against double cones of the shape grippers.

4. An adaptor for bolts, nuts or rim screw heads for mounting a fixing disk of an anti-skid device, particularly for vehicle wheels carrying pneumatic tires when driven on ice and snow, said anti-skid device having a fixing disk attachable to the wheel rim and provided with openings for attaching to rim screws or wheel studs, and a supporting disk held and lockable on the fixing disk by means of a retaining ring and having a plurality of equidistant radially directed anti-skid arms formed in a prebent profile from plastic or some other suitable material engaging over the tire tread and provided externally and internally on their free ends with a gripping profile, while having spikes or metal bodies on the outside, wherein the adaptor engaging over the head of a bolt rim screw comprises a cap-shaped outer part and a cap-shaped inner part, the outer part having fixed grippers for engaging over the inner part, the inner part being provided with a wall, for the formation of holding sections, with longitudinal slots and shape grippers and one of said outer part and said inner part having a tapped hole longitudinally formed therein, whereby, by screwing or pressing the outer part over the inner part in the longitudinal direction of the bolt, nut or rim screw, the shape grippers are pressed against a bolt, nut or rim screw head, for forming a durable, secure connection between the adaptor and the bolt, nut or rim screw head, the connection being detachable and reusable and, by means of the adaptor, different parts can be connected to the bolt, nut, or rim screw head by means of a screw engaging the tapped hole, the adaptor further comprising a nut with a laterally projecting, all-around edge and with a central longitudinal bore having an internal thread; a cap-shaped component which can be mounted on a hexagon head of a screw having a neck-shaped, drawn-in section with an external thread for receiving the internal thread of the nut and a central longitudinal bore having an internal thread for receiving a locking or fastening screw for a fixing disk of an anti-skid device, the cap-shaped component further having a circular cross-section lower portion with longitudinal slots formed in its wall for forming a plurality of position-variable, laterally downwardly bendable shape grippers which may spring back into their initial postion; and a sleeve having an internal diameter approximately corresponding to the external diameter of the circular lower portion of the component and having a lower, all-around edge for engaging the conically outwardly widening lower wall surface of the shape grippers of the component, whereby when said component is positioned so that said gripper surrounds the hexagonal head of the screw and the sleeve is positioned over the component, the tightening of said nut on said component causes the lower, all-around edge of the sleeve to exert a contact pressure on said grippers and accompanied by the simultaneous formation of a press fit of the grippers on the hexagon head of the screw.

5. An adaptor according to one of the claims 1 to 3, wherein the inner and outer parts of the adaptor have engaging conical threads.

6. An adaptor according to claim 1, wherein the inner part is constructed as a sheet metal part.

7. An adaptor according to claim 1, wherein the inner part is constructed in multipart manner.

8. An adaptor according to claim 1, wherein the outer part is constructed as a drawing part.

9. An adaptor according to claim 1, wherein the inner and outer parts are constructed as shaped parts.

10. An adaptor according to claim 1, wherein the inner part includes a threaded pin for connecting with the outer part.

11. An adaptor according to claim 1, wherein the shape or grippers have a profiled surface on the inside.

12. An adaptor according to claim 1, wherein the inner part has a mount for a securing lock for securing the connection.

13. An adaptor according to claim 1, wherein the outer part has a mount for a securing lock for securing the connection.

14. An adaptor according to claim 1, wherein the inner part includes means for locking the connection.

* * * * *